US012477009B2

(12) United States Patent
Singh et al.

(10) Patent No.: US 12,477,009 B2
(45) Date of Patent: Nov. 18, 2025

(54) INTENT-BASED POLICY CONFIGURATION USING NATURAL LANGUAGE

(71) Applicant: Cisco Technology, Inc., San Jose, CA (US)

(72) Inventors: Prabhat Kumar Singh, San Jose, CA (US); Prashanth Palasamudram Ramagopal, Suwanee, GA (US); Renuka Kumar, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 124 days.

(21) Appl. No.: 18/532,923

(22) Filed: Dec. 7, 2023

(65) Prior Publication Data
US 2025/0193244 A1    Jun. 12, 2025

(51) Int. Cl.
*H04L 9/40* (2022.01)
*G06F 40/40* (2020.01)

(52) U.S. Cl.
CPC .............. *H04L 63/20* (2013.01); *G06F 40/40* (2020.01)

(58) Field of Classification Search
CPC ................................ H04L 63/20; G06F 40/40
See application file for complete search history.

(56) References Cited

U.S. PATENT DOCUMENTS

| 10,902,220 B2* | 1/2021 | Lozon ..................... G06F 40/30 |
| 2009/0178102 A1* | 7/2009 | Alghathbar ......... G06F 21/6218 726/1 |
| 2014/0165127 A1 | 6/2014 | Bialik et al. |
| 2016/0219048 A1 | 7/2016 | Porras et al. |
| 2019/0050476 A1 | 2/2019 | Florentino et al. |
| 2019/0058734 A1 | 2/2019 | Xu et al. |
| 2022/0239567 A1 | 7/2022 | Manuel-Devadoss |
| 2023/0205824 A1* | 6/2023 | Jablokov ................. G06F 16/93 707/737 |

* cited by examiner

*Primary Examiner* — Sm A Rahman
(74) *Attorney, Agent, or Firm* — Lee & Hayes, P.C.

(57) ABSTRACT

Techniques are described for providing a natural language network security policy assistant for allowing a network administrator to implement network security policies using natural language security policy requests. A natural language request can be received by a user and can be translated using Artificial Intelligence into one or more security policy clauses. If the natural language security policy request leads to ambiguities with regard to intended security policies, one or more clarifying questions can be generated as natural language questions and sent to the user for clarification. One or more security policies can be implemented based on the one or more security policy clauses generated in response to the natural language security policy request and/or the natural language response to the clarifying questions.

20 Claims, 6 Drawing Sheets

INTENT-BASED POLICY CONFIGURATION USING NATURAL LANGUAGE

TECHNICAL FIELD

The present disclosure relates generally to policy configuration and management using natural language.

BACKGROUND

Network policy is a collection of rules that govern the behaviors of network devices. Just as a federal or regional government may create policies for state or districts to follow to achieve national objectives, network administrators define policies for network devices to follow in order to achieve business objectives. A network that runs on policies can be automated more easily and therefore respond more quickly to changing needs. Many common tasks, such as adding devices and users and inserting new applications and services can be accomplished. Well-defined policies can benefit a network in several ways. Network security polices can align the network with business needs. Network security policies can also provide consistent services across an entire infrastructure. In addition, well defined security policies can create agility through greater automation. Also, well defined security policies can make performance of the network or enterprise network more dependable and verifiable. Another advantage to enterprises is the security gains provided by the policy. By granularly defining policies that give users and devices the least amount of access to resources that they need to do their jobs, an administrator can better protect sensitive data. Violations can be caught and mitigated quickly. Such zero-trust security measures reduce risk, contain threats, stop lateral movement of malware, and help verify regulatory compliance.

Security policies are a collection of constraints or rules that a security administrator of an enterprise or enterprise network configures to manage access and regulate communication between applications that belong to an enterprise's network. An entity may be a user, a network device, private applications that belong to an enterprise, or public Internet Services. These policies define the permissible actions for communicating entities and are enforced by one or more security enforcement engines that manage an enterprise's network. Typically, admins create thousands (in some cases, even millions) of policies for security enforcement. Policy configuration typically takes an intent-based approach that offers admins the ability to specify the outcome expected from policy enforcement (e.g., allowing or blocking access) depending on the entities that are communicating. However, conventional approaches to creating and managing such intent-based security policies involve guided interactive workflows via user interfaces that allow an administrator to select from hundreds of source and destination entities in addition to choosing from a wide array of policy configuration parameters that specify. For instance, the time of day a policy is to take effect or the device's specifications (also referred to as posture) that is permitted for use when communicating in an enterprise network. An administrator repeats this process several times, potentially hundreds of time when the enterprise network is large, making it a very cumbersome process.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1:
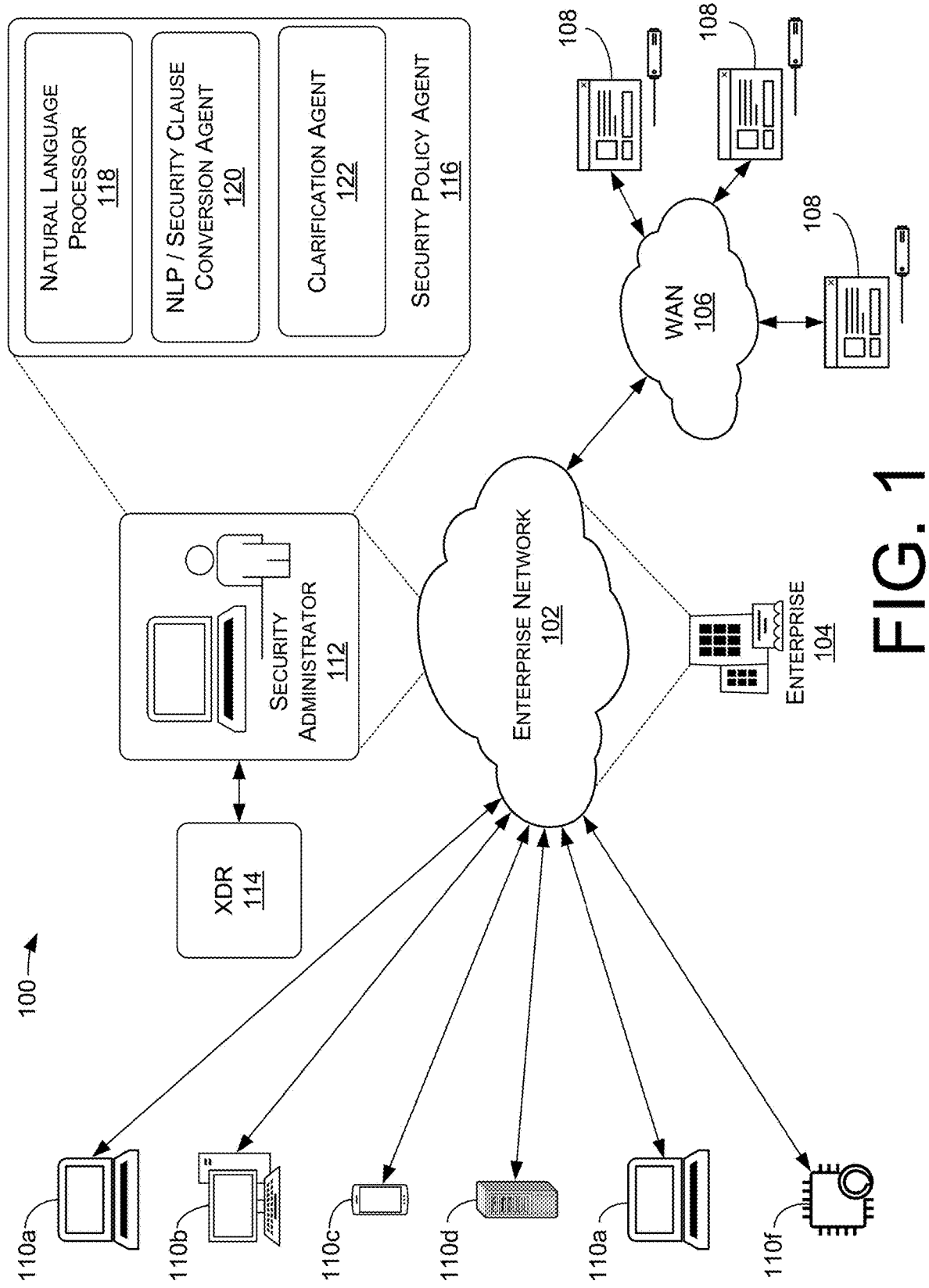
FIG. 1 illustrates a schematic of a computer network architecture for implementing natural language security policy requests.

Embodiments described herein provide techniques for implementing network security policies using natural language security policy requests. A security policy request is received from a user, and a determination is made that the security policy request is configured in a natural language such as a spoken or written language. A determination can be made as to whether the natural language security policy request presents ambiguities as to what specific security policy the user wishes to implement. If the natural language request presents such ambiguities, then one or more clarifying questions can be generated and sent to the user, preferably in a natural language format. A response can be received from the user, the response including an answer to the clarifying question or questions. One or more security policy clauses are then generated based at least in part upon the natural language security policy request and the response to the clarifying question or questions. A network security policy can then be implemented using the generated one or more security policy clauses.

Additionally, the techniques described herein may be performed by a system and/or device having non-transitory computer-readable media storing computer-executable instructions that, when executed by one or more processors, performs the method described above.

Example Embodiments

Network administrators and IT teams use network security policy management to control their network environments and protect their organizations against evolving threats. Network security policy management streamlines security policy design and enforcement. It applies rules and best practices to manage firewalls and other devices more effectively, efficiently, and consistently.

Businesses must protect people, physical assets, and data that travels across and lives within their networks. Administrators do this by setting security policies that describe in detail parameters such as who or what is allowed to access which resources. The job gets more challenging as networks become more complex. Companies with large infrastructures accumulate vast libraries of security policies across a vast array of security products.

As organizations add more people and more devices, they seek ways to automate tedious and repetitive tasks, simplify operations, and identify inconsistencies that cold leave them vulnerable to attack. Network security policy management helps them gain visibility across their distributed environment, and then organize and standardize these policies to improve business security.

Security policies govern the integrity and safety of the network. They provide rules for accessing the network, connecting to the Internet, adding, or modifying devices or services, and more. However, rules are only effective when they are implemented. Network security policy management helps organizations stay compliant and secure by ensuring that their policies are simplified, consistent, and enforced.

Network security policy management tools and solutions are available. Businesses use them to automate administrative tasks, which can improve accuracy and save time. The solutions can make management processes less tedious and time consuming and can free up personnel for higher value projects. These solutions also help IT teams avoid misconfigurations that can cause vulnerabilities in their networks. And, if problems arise, network security policy management solutions can ease troubleshooting and remediation.

Companies such as Cisco® offer a variety of options for managing network security, including cloud-based, centralized, or on-box management systems. Choosing the right tool depends upon an enterprise's environment and business needs.

Network security is a broad term that covers a multitude of technologies, devices, and processes. In its simplest terms, it is a set of rules and configurations designed to protect the integrity, confidentiality and accessibility of computer networks and data using both software and hardware technologies. Every organization, regardless of its size, industry or infrastructure, requires a degree of network security solutions in place to protect it from the ever growing landscape of cyber threats in the word today.

Today's network architecture is complex and is faced with a threat environment that is always changing and attackers that are always trying to find and exploit vulnerabilities. These vulnerabilities can exist in a broad number of areas, including devices, data, applications, users and locations. For this reason, there are many network security management tools and applications in use today that address individual threats and exploits and also regulatory non-compliance. When just a few minutes of downtime can cause widespread disruption and massive damage to an organization's bottom line and reputation, it is essential that these protection measures are in place.

There are many layers to consider when addressing network security across an organization. Attacks can happen at any layer in the network security layers model. Therefore, network security hardware, software and policies must be designed to address each area.

Network security typically consists of three different controls: physical, technical and administrative. There are various network security types and control. Physical security controls are designed to prevent unauthorized personnel from gaining physical access to network components such as routers, cabling cupboards and so on. Controlled access such as locks, biometric authentication and other devices provide important security resources for any organization.

Technical security controls protect data that is stored on the network, or which is in transit across, into or out of the network. Protection is twofold. It needs to protect data and systems from unauthorized personnel, and it also needs to protect against malicious activities from employees.

Administrative security controls consist of security policies and processes that control user behavior, including how users are authenticated, their level of access and also how IT staff members implement changes to the infrastructure.

The above description relates to different types of network security controls. There are various different ways to secure a network. One way is through network access control. To ensure that a potential attacker cannot infiltrate the network, comprehensive access control policies need to be in place for both users and devices. Network access control (NAC) can be set at the most granular level. For example, administrators could be granted full access to the network, but access to specific confidential folders can be denied or administrators personal devices can be prevented from joining the network.

Antivirus and antimalware software can protect an organization from a range of malicious software, including viruses, ransomware, worms and trojans. The best software not only scans files upon entry to the network but continuously scans and tracks files. In addition, Firewall protection can act as a barrier between the untrusted external networks and trusted internal network. Administrators typically configure a set of defined rules that block or permit traffic onto the network. For example, a firewall can offer seamless and centrally managed control of network traffic, whether it is physical, virtual or in the cloud.

Virtual Private Networks (VPNs) create a connection to the network from another endpoint or site. For example, users working from home would typically connect to the organization's network over a VPN. Data between the two points is encrypted and the user would need to authenticate to allow communication between their device and the network. Available cloud-based applications allow organizations to quickly create VPNs using drag-and-drop features to protect all locations within the network.

Network security is a high priority for any organization that works with networked data and systems. In addition to protecting assets and the integrity of data from external exploits, network security can also manage network traffic more efficiently, enhance network performance and ensure secure data sharing between employees and data sources.

There are many tools, applications, and utilities available that can help an administrator to secure a network from attack and unnecessary downtime. Such tools and applications can offer network security solutions that centralize and simplify what are often complex processes and ensure robust network security in place across a network.

Security policies are a collection of constraints or rules that a security administrator of an enterprise network can configure to manage access and regulate communication between entities from or to an enterprises network. An entity may be a user, a network device, private applications that belong to an enterprise, or public Internet services. These policies define the permissible actions for communicating entities and are enforced by one or more security enforcement engines that manage an enterprise's network. Typically, security administrators create thousands or even millions of policies for security enforcement. Policy configuration typically takes an intent-based approach that offers administrators the ability to specify the outcome expected from policy enforcement, such as allowing or blocking access, depending on the entities that are communicating. However, conventional approaches to creating and managing such intent-based security policies involve guided interactive workflows via user interfaces that allow an administrator to select from hundreds of source and destination entities besides choosing from a wide array of policy configuration parameters that specify, for instance, the time of day that a policy is to take effect or the device's specification that are permitted for use when communicating in an enterprise network. An administrator repeats this process several times, potentially hundreds of times when the enterprise network is large, making it a very cumbersome process.

Intent-based security policies grant a security administrator the ability to configure policies in terms of the access control desired when entities of an enterprises network communicate with each other or with services on the Internet. Techniques described herein simplify and augment a security administrator's experience with regard to configuring thousands of rules that secure enterprise networks by allowing the administrator to interact with a natural language model that has been fine-tuned with policy grammar, thus enabling configuration of policy rules as a conversation. To do this the techniques disclosed herein leverage the fact that intent-based policies can be expressed in a natural language such as English, German Japanese, etc., which is then supplied to a policy enforcement engine that understands natural language policy clauses. An example of a natural language policy can be expressed as, for example, "Block everyone access to social media sites during office hours on weekdays from laptop computers", or as "No one has access to social media sites during office hours on weekdays when using a laptop computer. Similarly, the rules could be expressed as, "On weekdays, during office hours, no one has access to social media from a laptop."

As can be seen, there may be many different ways to express a rule, which the model can be trained to handle. Beyond enabling easy configuration of an enterprise's network policies, such natural language policies also facilitate readability and maintainability in the long term.

Unlike previous techniques where a user's commands are converted to a natural language query, which is then used to query a language model, the techniques described herein leverage the power of large language models to convert a user's intent written in a natural language into a format that can be consumed by a policy enforcement service, which can be a computer program that consumes the policy commands for enforcement. These techniques further simplify a user's experience of configuring multiple disparate policies by composing policy clauses together using conjunction or disjunction operators of the natural language.

There are several factors that should be accounted for when allowing an administrator to create a security policy. First, certain expressions such as office hours may be context-specific to an enterprise. To resolve such ambiguities, the natural language intent-based policy engine will ask clarifying questions to the administrator to collect contextual information about the enterprise. Second, the natural language vocabulary will consist of thousands of words, many of which are not relevant to policy configurations. As a result, the configuration engine can sanitize and validate invalid inputs an administrator may enter to prevent the creation of invalid policies. To do so, the engine can enforce the policies in such a way as to conform to a certain grammatical model that is indicative of a valid policy. While the goal of policy grammar is to weed out invalid policies, it does not reduce the ability of an administrator to leverage natural language to express policies in their own way.

Examples of policy clauses that an enforcement engine can apply to validate and establish a conforming policy include:

Source_Entity à User | User Groups | IP Address | Port | Protocol | Network Tunnel
Example of a User, Similar grammar can be defined for any entity
User à [a-bA-Z0-p]\w+
Source_Entity à <Source_Entity> AND <Source_Entity>
indicates multiple sources
Destination_Entity à IP Address | Port | Private App | Private App Group | URLS
Destination_Entity à <Destination_Entity > AND < Destination_Entity >
Sample examples of policy parameters
Parameters à Intrusion Prevention Mode | Session Timeout | Time of Day | Operating System
Operating System à Windows | Mac
Session Timeout à [0, 320] minutes
Action à Allow | Block | Warn | Isolate
Allow à Allow | Has Access To | Access to | Give Access
Block à Block | Exclude | Not
Warn à Warn | Notify
isolate à Isolate
JoinOp à And
Conjuctions à For, But
Policy à <Action> < Destination_Entity> <Conjunction> <Source_Entity>
Policy à <Source_Entity> <Action> <Destination_Entity> <Conjuction> <Source_Entity>
Policy à <Source_Entity> <Action> <Destination_Entity>
Policy à < Policy > | Policy <JoinOp> Policy | Epsilon When creating a policy, the policy engine searches for matching source and destination entities from a list of several hundreds of them, which may add a significant overhead on policy creation. Such a search for an entity may also return multiple entities that match the search criteria. For instance, in the policy, "Block Paris access to Confluence®" the source entity "Paris" may either be a person's name, or a geographic location. To resolve such ambiguities, the policy engine is also trained to understand certain qualifiers for source and destination entities. A qualifying entity may be "user" "user group", "geographic location,", etc. An example policy could be: "Block user Paris access to private app Confluence". The use of such qualifiers also mitigates the policy engine's overhead when searching within thousands of entities.

While many of the techniques described herein are with reference to security policies and intent-based security policies, the techniques are equally applicable for network policies and intent-based network policies. For example, quality of service (QOS) may be a network policy that may be expressed in an intent-based format. For example, a network policy could be something to the effect of "give all TCP traffic on port 80 highest priority", which is slightly different from saying "give Jane Doe access to port 80". The latter is a security policy, whereas the former is network policy. Another example of a network policy is "only allow passwords that contain one upper case and one special character" or "drop packets if its time-to-live exceeds 10 hops". Thus, network policy may be expressed in an intent-based format, and the techniques of this application are equally applicable to network policy as well as network-security policy FIG. 1 illustrates a schematic of a Computer Network Architecture 100. The Computer Network Architecture 100 includes a computer network which can be an Enterprise Network 102. The Enterprise Network 102 can be associated with an Enterprise 104, which can be, for example, a business, campus, government entity, etc. The Enterprise Network 102 can be connected with or in communication with a Wide Area Network (WAN 106). The WAN 106 can be a publicly accessed network such as the Internet. Various Server Computers 108, which may host web applications cloud data storage systems, or other computer resources can be connected with or in communication with the WAN 106.

With continued reference to FIG. 1, various end user devices 110(*a-f*) can be connected with and/or in communication with the Enterprise Network 102. The end user devices 110 can be various types of electronic devices. For example, the end user devices 110 can include one or more laptop computers 110*a*, 110*a*. The end user devices 110 can also include one or more desktop computers 110*b*, one or more server computers 110*d*, one or more wireless telecommunication devices (e.g., cell phones) 110*c*, or Internet of Things (IoT) devices 1102*f*.

The end user devices 110(*a-f*) can be connected with one another via the Enterprise Network 102. In addition, the end user devices 110(*a-f*) can access the external public WAN 106. In this way, the end user devices 110(*a-f*) can access various computers, server computers cloud-based services or web-applications, which can reside on various computer devices such as Server Computers 108 that are connected with or in communication with the WAN 106, (e.g., Internet).

Because the various end user devices 110 can access the WAN 106 and the various other electronic devices (e.g., Server Computers 108) associated therewith, the end user devices 110 as well Enterprise Network 102 itself can be vulnerable to various malicious attacks, such as from malware, spyware, ransomware, etc., which may reside on or be associated with Server Computers 108 connected with the WAN 106. In addition, security, privacy, employment policy or other concerns may create a desire to limit or control the access that each end user device 110 has with another user device. For example, the server computer 110*d* may include certain sensitive information that should not be accessible to certain user devices (e.g., user laptop computer 110*a*). In addition, there may be a desired to limit what web services such as Internet searches, websites, etc. may be accessible to one or more user devices 110. This may be dictated, for example by employment policies, productivity concerns, legal concerns, etc.

A Security Administrator 112 may be employed to protect the integrity of the end user devices 110 as well as the integrity of the Enterprise Network 102. The Security Administrator 112 can employ various security tools such as Extended Detection and Response services (XDR 114) or other cybersecurity software or services to protect the security and integrity of the Enterprise Network 102 as well as the security and integrity of the various end user devices 110. The XDR 114 can collect and correlate data across email, endpoints, servers, cloud workloads, and networks such as the Enterprise Network 102 and WAN 106 enabling visibility and context into advanced threats. Threats can then be analyzed, prioritized, hunted, and remediated to prevent data loss and security breaches. With such visibility and context into threats, events that would not have been otherwise addressed can surface to a higher level of awareness, allowing the Security Administrator 112 quickly focus on and eliminate any further impact and reduce the severity and scope of an attack.

In order to further protect the Enterprise Network 102 and end user devices 110, as well as to control access between various user devices 110 and between the user devices 110 and the various Server Computers 108 of the WAN 106, the Security Administrator 112 can set various security policies regarding the end user devices 110 and the Enterprise Network 102. To set the security policies for the Enterprise Network 102 and various connected end user devices 110, the Security Administrator 112 can employ a Security Policy Agent 116. In certain embodiments, the Security Policy Agent 116 can be incorporated with or associated with the security service (e.g., XDR 114). In other embodiments, the Security Policy Agent 116 can be a service separate from the XDR 114. In some embodiments, the Security Policy Agent 116 can reside on a server or other computer device (not shown) that can reside on the Enterprise Network 102 and that can be accessed by the Security Administrator 112. In other embodiments, the Security Policy Agent 116 as well as the XDR 114 can be a cloud-based service, which can reside on one or more computer devices connected with the WAN 106.

The Security Policy Agent 116 includes tools for allowing the Security Administrator 112 to efficiently and accurately set and monitor desired security policies for the Enterprise Network 102 as well as the end user devices 110. The Security Policy Agent 116 includes a Natural Language Processor 118, an NLP/Security Clause Conversion Agent 120 and a Clarification Agent. The Natural Language Processor 118 includes circuitry and/or logic for receiving one or more security policy requests from the Security Administrator 112. The Natural Language Processor 118 receives these instructions as, for example, written or verbal instruction presented in a natural language such as English, French, Japanese, or any other natural human language. The Natural Language Processor 118 can process the natural language request to interpret the request in terms of known security policy instructions. The Natural Language Processor 118 can work in conjunction with the NLP/Security Clause Conversion Agent to convert the natural language request into one or more security policy clauses that can be implemented by a computer device to implement a desired security policy. In addition, the Natural Language Processor 118 can work in conjunction with the Clarification Agent 122 to clarify any ambiguities arising as a result of the natural language security policy request. If the natural language security policy request leads to such ambiguities either the Clarification Agent 122 can generate one or more clarifying questions for the Security Administrator 112. The Security Administrator 112 can then respond with an answer to the clarifying questions in order to reconcile the ambiguity, as will be described in greater detail herein below. With the ambiguities resolved, the Natural Language Processor 118 and NLP/Security Policy Conversion Agent 120 can generate one or more recognized security policy clauses which can be used to implement the desired security policy or policies. In one embodiment, the security policy clauses can be used by the XDR or some other security agent to implement the desired security policy requested by the Security Administrator 112.

One or more of the Natural Language Processor 118, NLP/Security Clause Conversion Agent 120 and Clarification Agent 122 can employ Artificial Intelligence (AI) or machine learning to translate the natural language request into computer usable security policy clauses, resolve ambiguities resulting from the natural language security policy request and implement security policies. The Security Policy Agent 116 simplifies and augments security policy administration by allowing configuration of thousands of rules to secure the Enterprise Network 102 and connected devices 110 by allowing an administrator to configure policies (i.e., rules) as a natural language conversation. To do this the Security Policy Agent 116 leverages the fact that intent-based policies are more easily expressed in a natural language. Thus, instead of clicking through several pages of guided screens that are both time consuming and laborious, the Security Administrator 112 can simply express a policy in a natural language which is then supplied to a policy enforcement engine (Security Policy Agent 116) that understands natural language policy clauses.

Figure 2:
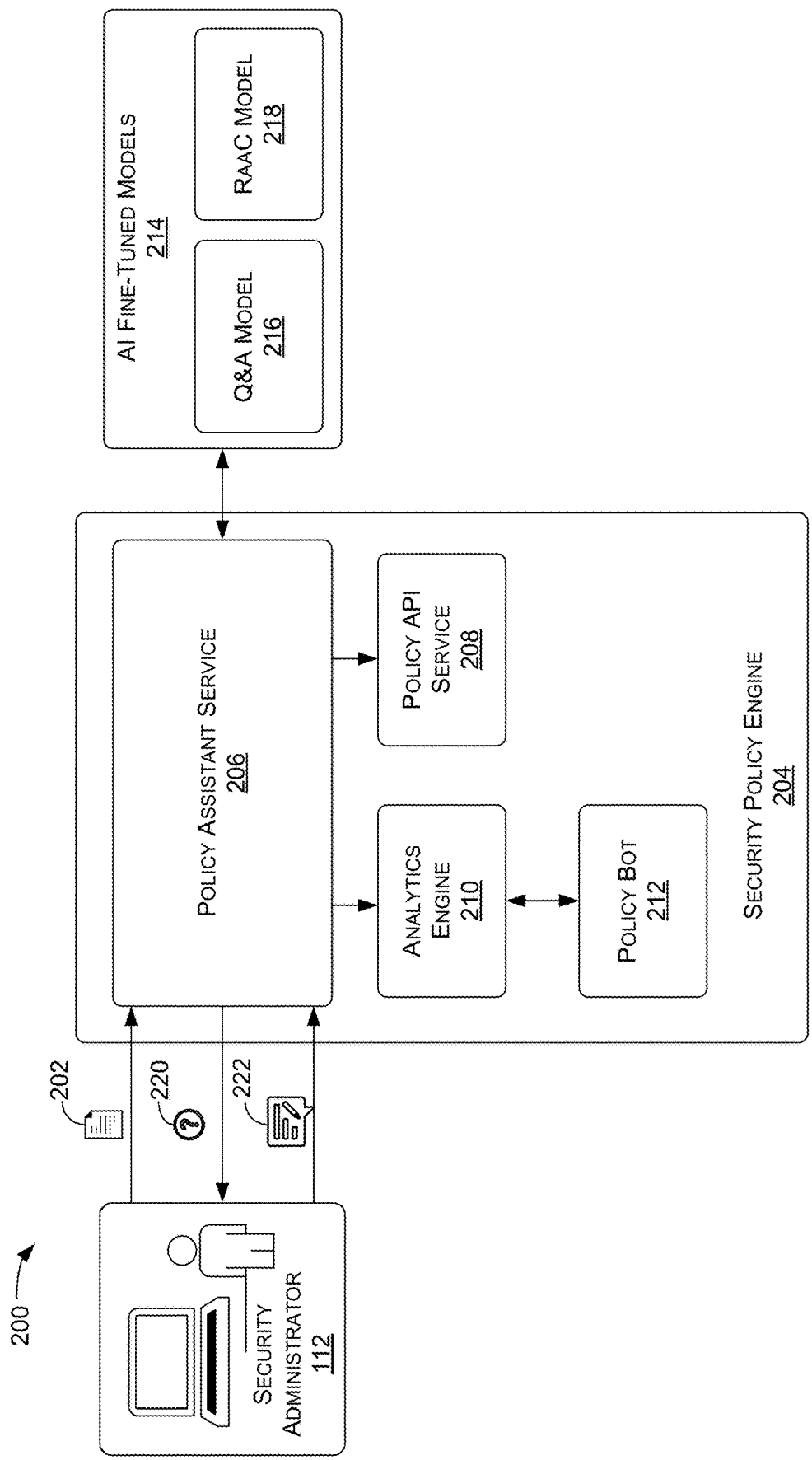
FIG. 2 illustrates a schematic of a system for implementing Artificial Intelligence (AI) to process natural language security policy requests.

FIG. 2 illustrates a schematic of system 200 for using natural language input to set security policies for a network such as an enterprise network (e.g., Enterprise Network 102, FIG. 1). A Security Administrator 112 can send a Natural Language Security Policy Request 202 to a Security Policy Engine 204. The Security Policy Engine 204 can include a Policy Assistant Service 206, an Intermediate Service 208, an Analytics Engine 210, and a Policy-Bot 212. The Policy Assistant Service 206 can process the Natural Language Security Policy Request 202. The Policy Assistant Service 206 can employ Artificial Intelligence (AI) models (AI Fine-Tuned Models 214) to translate and clarify the Natural Language Security Policy Request 202. The AI Fine-Tuned Models 214 employ a question-and-answer model (Q&A Model 216) and Rule as a Conversation (RaaC) model (RaaC Model 218) to translate, interpret and clarify the Natural Language Security Policy Request 202. The RaaC Model 218 receives the Natural Language Security Policy Request 202 and translates that into one or more security policy clauses from among many available security policy clauses. The RaaC Model 218 employs Artificial Intelligence (AI) that has been specially configured to recognize security policy clauses defined by the natural language request. The RaaC Model 218 can also learn from previous security policy request processing to improve the speed and accuracy of such natural language translations.

The Q&A Model 216 can recognize ambiguities arising from the natural language request and can be used to generate a question-and-answer session to resolve such ambiguities. By way of example, if the Natural Language Security Policy Request 202 states "block Paris from social media sites", there could be an ambiguity as to whether the request intends to block a specific user named "Paris" or whether the security policy request intended to block users or devices within a region, such as Paris, France. The Q&A Model, 216 can generate a question such as, "Do you wish to block the user "Paris" or the devices within the geographic region Paris, France"? The these clarifying questions can be sent to the Policy Assistant Service 206, which can send a query 220 as a question to the Security Administrator 112. The Security Administrator 112 can then send a reply 222 in the form of a natural language answer to the query 220. The Policy Assistant Service 206 can then provide information regarding the clarifying reply 222 to the AI Fine-Tuned Models 214 to allow the Q&A Model 216 to resolve the ambiguity and to allow the RaaC Model 218 to generate or determine one or more security policy clauses intended by the Natural Language Security Policy Request 202.

In a first use case example, the RaaC Model 218 can configure or set-up policy intents or rules as a conversation. The RaaC Model 218 can translate the Natural Language Security Policy Request 202 into one or more security policy clauses recognized by the Security Policy Engine 204. The security policies clauses can be selected from thousands or even millions of established recognized security policy clauses. Examples of natural language security policies can be, for example, "block all adult websites for all users", or "allow cisco.com for Joan Smith". An advantage of such a model is that it allows for quick configuration for common use cases. Another advantage is that it provides a greatly enhanced customer experience for the Security Administrator 112.

In another use case, the AI Fine-Tuned Models 214 can be used to provide feedback to the Security Administrator 112 to provide help and tutelage to assist the Security Administrator 112 with configuring the security policies. For example, the Security Administrator 112 may as questions such as: "How should I enable logging?": "How can I create a Firewall Policy?": or "Why should I enable logging?". The Q&A Model 216 can process such a query and provide useful real-time advice on how to best perform such a task or why such a task would be advantageous. The Q&A Model can even provide useful feedback to the Security Administrator as to how security policies can be best implemented or improved without receiving a direct question from the Security Administrator 112. For example, by learning from previous sessions and compiling machine knowledge of network security policy configuration and previous security policy issues, the Q&A Model can provide advice to the Security Administrator 112 to make the Security Administrator aware of a most efficient or most secure security policy configuration. For example, the Q&A Model might know that a user Joe Smith has previously accessed websites that have made the network vulnerable to malware. The Q&A Model could make the Security Administrator 112 aware of this fact and suggest further restricting that user's access to websites outside of the network (e.g., Enterprise Network 102 FIG. 1).

Advantages provided by the Q&A Model 216 include available on-demand feedback without having to click through several pages of documents. Another advantage provided by the Q&A Model 216 is that detailed information can be queried by the Security Administrator 112. In addition, such a conversation provided by the Q&A Model 216 can provide explanations of security settings in easily understandable layman terms. The Q&A Model 216 can also democratize security expertise and know-how interactively through policies allowing for less specialized training to implement security policies.

The system 200 can also provide policy recommendations. In one embodiment, the Analytics Engine 210 can be leveraged to determine proactive feedback to the Security Administrator and can work in conjunction with the Q&A Model 216 to assist the Security Administrator 112 with setting security policies. The Analytics Engine 210 determine such recommendation by individual customer based on previous usage patterns. This can involve the use of behavior analytics using stored data regarding previous security policy usage. In addition, the Analytics Engine 210 use stored data regarding other, similar customers. By way of example, the Analytics Engine 210 can determine that other similar customers also block social media websites. The Q&A Model 216 can then provide feedback to the Security Administrator 112 to provide that feedback. In addition, the Analytics Engine 210 can perform threat analytics based on real-time threat indicators. In one embodiment, threat analytics can be implemented using a Policy-Bot 212 that continually searches for potential threats. For example, the Analytics Engine 210 can determine that anomalous traffic has been indicated from IP address 10.10.X.X. The Analytics Engine 210 can generate a recommendation to block that IP address.

Policy administration can further be enhanced by use of the Policy API Service 208. The Policy API Service 208. An API is an Application Programming Interface. The Policy API Service 208 can be a software intermediary that allows various applications to talk with one another. It provides an accessible way to extract and share data within and across organizations.

Figure 3:
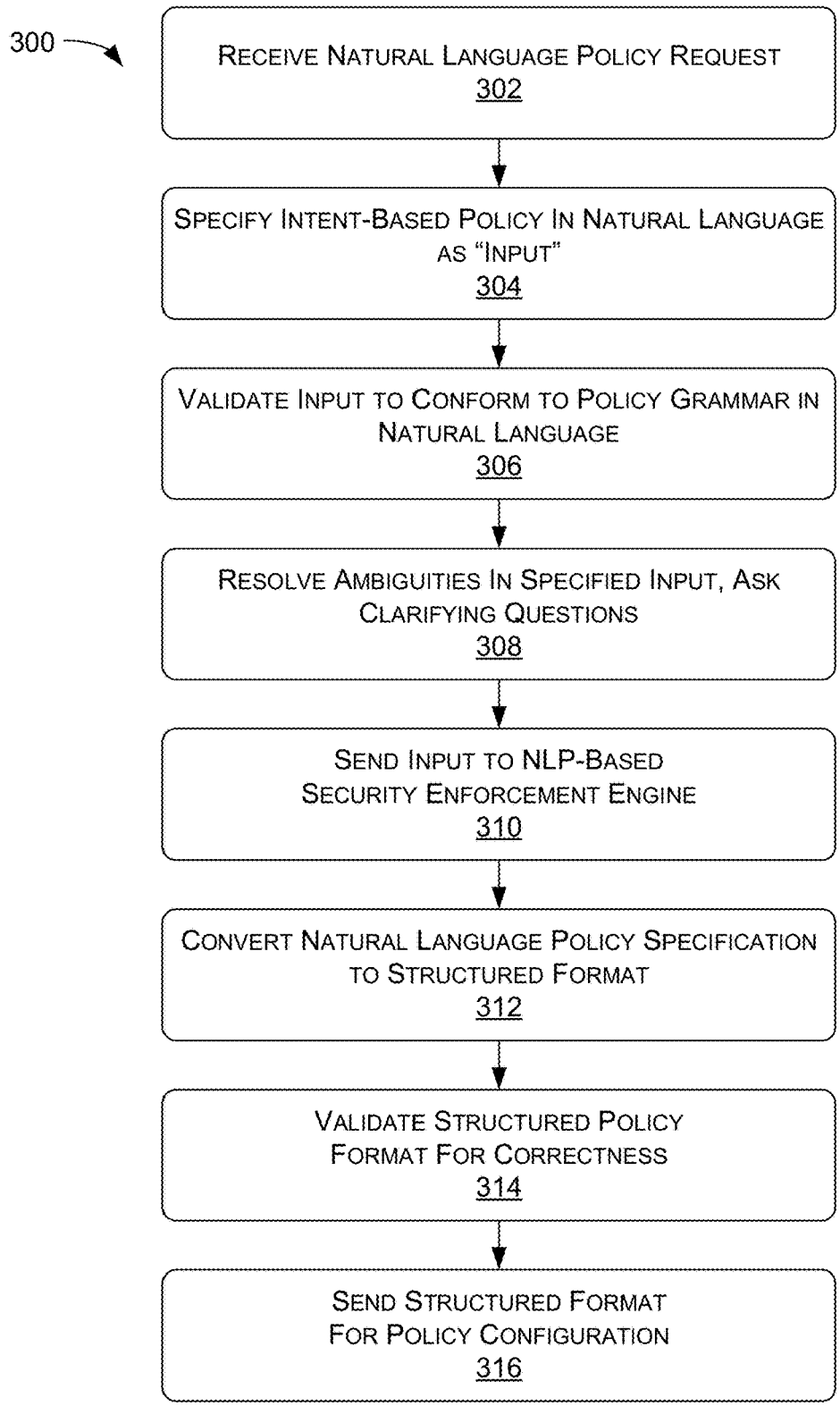
FIG. 3 illustrates a flowchart describing a method for implementing natural language security policy requests.

FIG. 3 is a flowchart illustrating a method 300 for implementing natural language security policy enforcement. In an operation 302 a policy request is received. The policy request is received as a natural language request, in a natural, human language such as English, Japanese, French, etc. The natural language policy request can be received as written text, spoken language, or both. Then, in an operation 304 an intent-based natural language policy is specified as "input". The natural language request is analyzed and processed to determine the intent of the request as intended by a security administrator.

In an operation 306, the input is validated to conform to policy grammar in a natural language format. If there are ambiguities regarding the input, these are resolved in an operation 308. Such ambiguities can be resolved by generating clarifying questions and sending a query to a user such as a security administrator to ask the user or security administrator to respond to these clarifying questions.

In and operation 310, input (e.g., policy request) is sent to a natural language policy-based security enforcement engine (NLP-Based Security Enforcement Engine). The NLP-Based Enforcement Engine can process the policy request as a natural language policy request and determine the policies to be enforced. In an operation 312, the natural language policy specification is converted to a structured format. The structured format can include security policy clauses that are recognized by a security policy system, and which can be somewhat or very different from a natural language format.

In an operation 314, the format of the structure security policy is validated for correctness. This validation process can include sending the structured policy format to a security administrator for validation feedback. In one embodiment the policy format can be sent to the security administrator in a natural language format. In another embodiment, the policy format can be sent to the security administrator in a structured format including formal, established security policy clauses. In yet another embodiment, the structure format can be sent to the security administrator in both a natural language format and a structure format including formal, established security clauses. Sending the security format allows the security administrator to approve the security format to validate that this was the intended format.

In an operation 316, if the structure of the security format has been validated (e.g., by the security administrator) the structure security policy format can be sent for policy configuration. This can be performed, for example, by sending the structured security policy format to a security policy engine that can receive the formatted security policy and implement that policy for the network, such as an enterprise network for which the security administrator is charged with managing.

Figure 4:
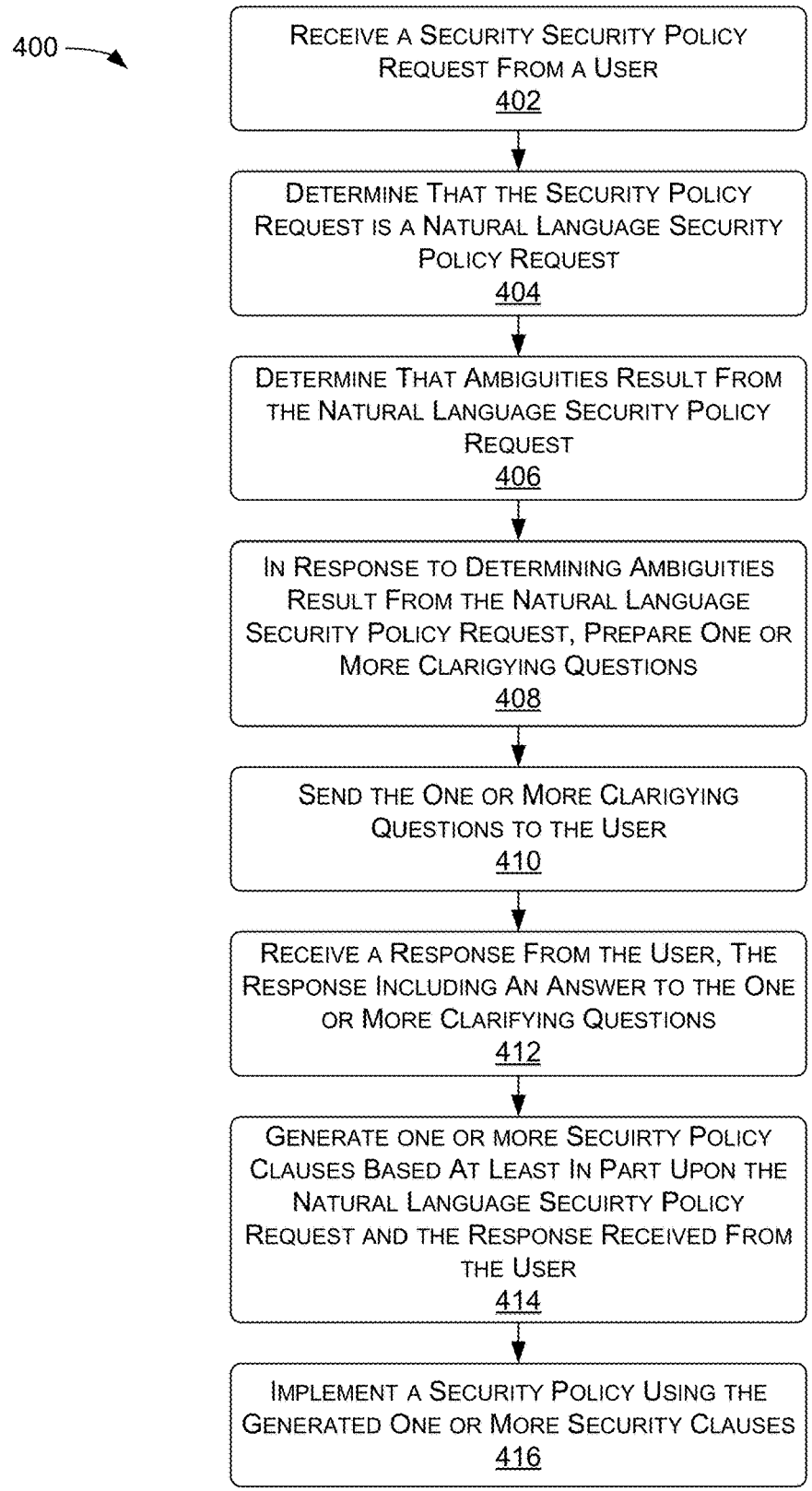
FIG. 4 illustrates a flowchart for processing natural language security policy requests with ambiguity resolution.

FIG. 4 is a flowchart illustrating a method 400 for implementing a security policy for a network using natural language security policy input from a user such as a network security administrator. In an operation 402, a security policy request is received from a user. As mentioned above, the user can be a security administrator tasked with managing the security of a network such as an enterprise network. The security policy request can be formatted as a natural language request. The natural language request can be in a human language, such as English, Japanese, Russian or any other natural human language. The security policy request can be in a written language, a verbal request or both.

In an operation 404 a determination is made that the received security policy request is in a natural language format. (i.e., the Security policy request is a natural language security policy request). This can be performed using Artificial Intelligence (AI) logic capable of recognizing communications as being in a natural language. The AI logic can also be configured to determine which language the request is being made in, such as whether the request is in English, Mandarin, French, etc.

In an operation 406, a determination is made as to whether the natural language security policy request results in any ambiguities that must be clarified before a security policy can be established. By way of example, "block Savannah from visiting inappropriate websites". This could result in an ambiguity as to whether "Savannah" refers to a person named Savannah or refers to the region Savannah Georgia. There could also be an ambiguity as to whether "inappropriate websites" refers to adult websites, websites that can possibly be infected with malware, or social media websites in general. There could also be ambiguities when two users within the network have the same or similar names.

In an operation 408, in response to determining that the natural language policy request results in security policy ambiguities, one or more clarifying questions are prepared. These clarifying questions can be generated as natural language questions generated using AI. For example, in response to the previously described ambiguities, a clarifying question could include a statement such as "should access to inappropriate websites be blocked for Savannah Smith, Savannah Webster, or the facility located in Savannah Georgia". The clarifying question could also include a statement such as "do inappropriate websites include websites with adult content, all social media websites, or websites suspected of being infected with malicious software".

In an operation 410, the prepared clarifying questions are sent to the user, which as mentioned above could be a network security administrator. The clarifying questions can be sent in a natural language, and can be in written format, auditory format, or both. The clarifying questions can also be sent to include a method to allow an easy reply, such as including a menu or space for providing a reply. In an operation 412, a response to the clarifying question or questions is received from the user. The response can include answers to the clarifying questions. The answers can be in a natural language format. AI can be implemented to interpret the natural language response. The interpreted response can be analyzed to determine whether the response sufficiently clarifies the ambiguities. It the response does not sufficiently clarify the ambiguities another question or question can be sent to the user to initiate a further response to further clarify the ambiguity. If the response or responses do sufficiently clarify the ambiguity, then in an operation 414 one or more security clauses can be generated. The security clauses can be generated based at least in part upon the natural language security policy request received from the user and also the response received from the user. The one or more security clauses can be selected from a plurality of established, machine recognizable security clauses. In one embodiment, the security clauses can be selected from thousands or even millions of possible established security clauses. In an operation 416, a security policy can be implemented using the generated one or more security clauses. In one embodiment, the security policy can be validated before implementation. For example, the security policy can be sent to the user for confirmation that this is the correct, intended security policy requested. The security policy can be sent to the user in a natural language, as a set of security policy clauses or as both. A response can then be received from the user to either validate or deny the security policy. In one embodiment, if the security policy is not what the user intended, the user can provide a natural language reply including further clarifying language. In one embodiment, information regarding the generation of the one or more security policy clauses, the natural language request, the natural language response, and the implementation of the security policy can be stored and learned from form improving response to future natural language security policy requests.

Figure 5:
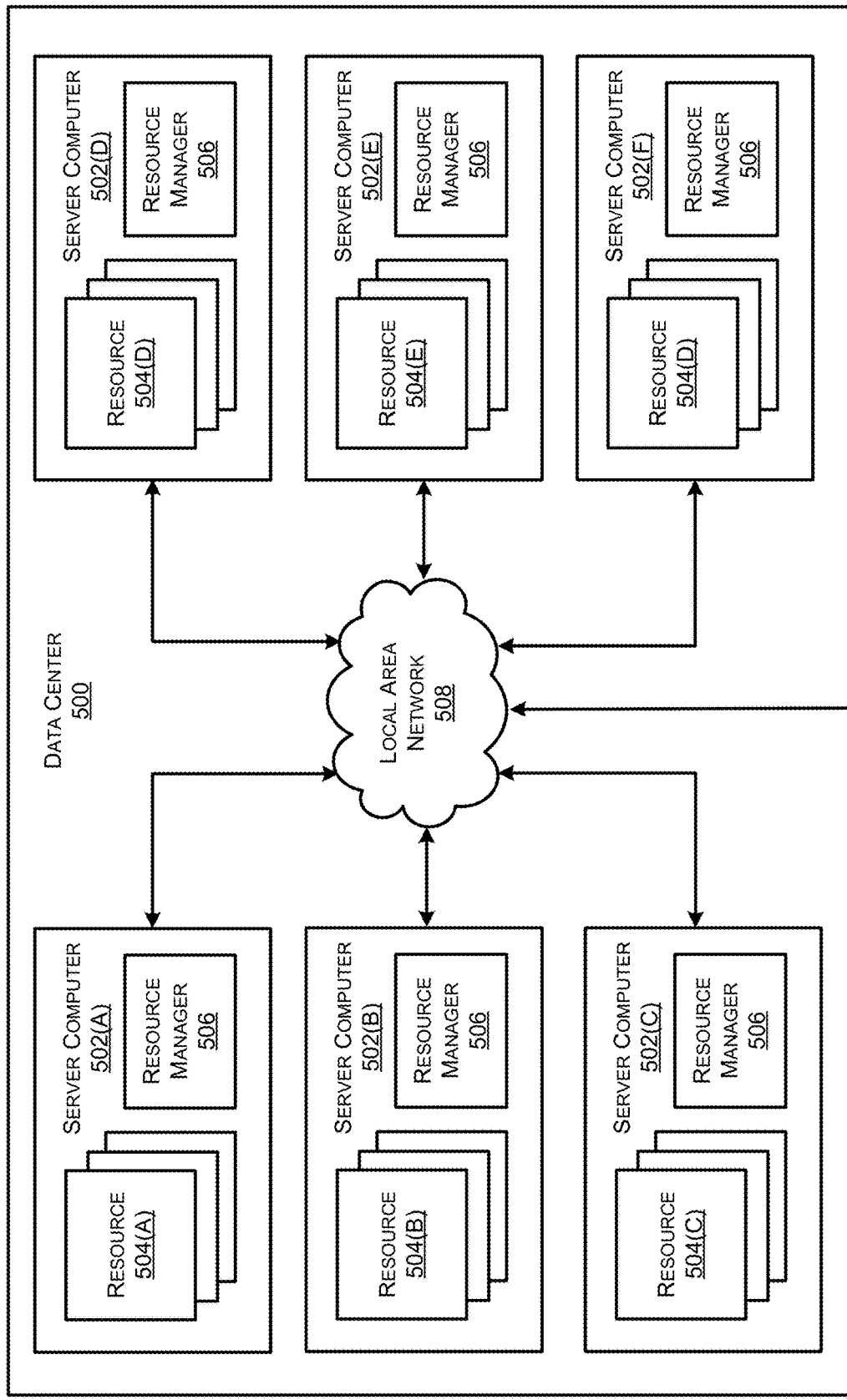
FIG. 5 illustrates a computing system diagram illustrating a configuration for a data center that can be utilized to implement aspects of the technologies disclosed herein.

FIG. 5 is a computing system diagram illustrating a configuration for a data center 500 that can be utilized to implement aspects of the technologies disclosed herein. The example data center 500 shown in FIG. 5 includes several server computers 502A-502F (which might be referred to herein singularly as "a server computer 502" or in the plural as "the server computers 502") for providing computing resources. In some examples, the resources and/or server computers 502 may include, or correspond to, the any type of networked device described herein. Although described as servers, the server computers 502 may comprise any type of networked device, such as servers, switches, routers, hubs, bridges, gateways, modems, repeaters, access points, etc.

The server computers 502 can be standard tower, rackmount, or blade server computers configured appropriately for providing computing resources. In some examples, the server computers 502 may provide computing resources 504 including data processing resources such as VM instances or hardware computing systems, database clusters, computing clusters, storage clusters, data storage resources, database resources, networking resources, and others. Some of the server computers 502 can also be configured to execute a resource manager 506 capable of instantiating and/or managing the computing resources. In the case of VM instances, for example, the resource manager 506 can be a hypervisor or another type of program configured to enable the execution of multiple VM instances on a single server computer 502. Server computers 502 in the data center 500 can also be configured to provide network services and other types of services.

In the example data center 500 shown in FIG. 5, an appropriate network 508 is also utilized to interconnect the server computers 502A-502F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between data centers 500, between each of the server computers 502A-502F in each data center 500, and, potentially, between computing resources in each of the server computers 502. It should be appreciated that the configuration of the data center 500 described with reference to FIG. 5 is merely illustrative and that other implementations can be utilized.

In some examples, the server computers 502 may each execute one or more application containers and/or virtual machines to perform techniques described herein.

In some instances, the data center 500 may provide computing resources, like application containers, VM instances, and storage, on a permanent or an as-needed basis. Among other types of functionality the computing resources provided by a cloud computing network may be utilized to implement the various services and techniques described above. The computing resources 504 provided by the cloud computing network can include various types of computing resources, such as data processing resources like application containers and VM instances, data storage resources, networking resources, data communication resources, network services, and the like.

Each type of computing resource 504 provided by the cloud computing network can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The cloud computing network can also be configured to provide other types of computing resources 704 not mentioned specifically herein.

The computing resources 504 provided by a cloud computing network may be enabled in one embodiment by one or more data centers 500 (which might be referred to herein singularly as "a data center 500" or in the plural as "the data centers 500"). The data centers 500 are facilities utilized to house and operate computer systems and associated components. The data centers 500 typically include redundant and backup power, communications, cooling, and security systems. The data centers 500 can also be located in geographically disparate locations. One illustrative embodiment for a data center 500 that can be utilized to implement the technologies disclosed herein will be described below with regard to FIG. 6.

Figure 6:
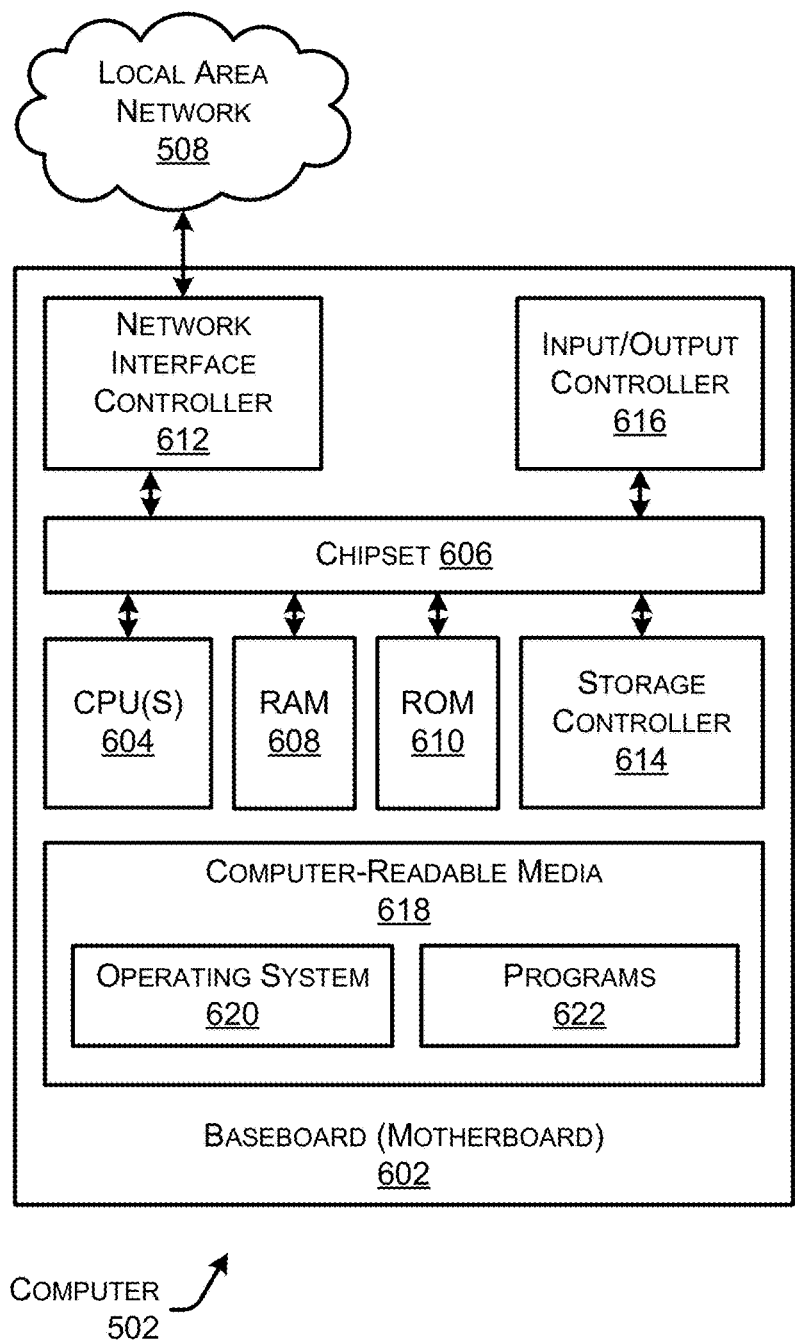
FIG. 6 is a computer architecture diagram showing an illustrative computer hardware architecture for implementing a computing device that can be utilized to implement aspects of the various technologies presented herein.

FIG. 6 shows an example computer architecture for a server computer 502 capable of executing program components for implementing the functionality described above. The computer architecture shown in FIG. 6 illustrates a conventional server computer, workstation, desktop computer, laptop, tablet, network appliance, e-reader, smartphone, or other computing device, and can be utilized to execute any of the software components presented herein. The server computer 502 may, in some examples, correspond to a physical server, and may comprise networked devices such as servers, switches, routers, hubs, bridges, gateways, modems, repeaters, access points, etc.

The server computer 502 includes a baseboard 602, or "motherboard," which is a printed circuit board to which a multitude of components or devices can be connected by way of a system bus or other electrical communication paths. In one illustrative configuration, one or more Central Processing Units (CPUs 604) operate in conjunction with a chipset 606. The CPUs 604 can be standard programmable processors that perform arithmetic and logical operations necessary for the operation of the server computer 502.

The CPUs 604 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 606 provides an interface between the CPUs 604 and the remainder of the components and devices on the baseboard 602. The chipset 606 can provide an interface to a RAM 608, used as the main memory in the server computer 502. The chipset 606 can further provide an interface to a computer-readable storage medium such as a read-only memory ("ROM") 10 or non-volatile RAM ("NVRAM") for storing basic routines that help to startup the serve computer 502 and to transfer information between the various components and devices. The ROM 610 or NVRAM can also store other software components necessary for the operation of the server computer 502 in accordance with the configurations described herein.

The server computer 502 can operate in a networked environment using logical connections to remote computing devices and computer systems through a network, such as the network 508. The chipset 606 can include functionality for providing network connectivity through a NIC 612, such as a gigabit Ethernet adapter. The NIC 612 is capable of connecting the server computer 502 to other computing devices over the network 608. It should be appreciated that multiple NICs 612 can be present in the server computer 502, connecting the computer to other types of networks and remote computer systems.

The server computer 502 can be connected to a storage device 618 that provides non-volatile storage for the computer. The storage device 618 can store an operating system 620, programs 622, and data, which have been described in greater detail herein. The storage device 618 can be connected to the server computer 502 through a storage controller 614 connected to the chipset 606. The storage device 618 can consist of one or more physical storage units. The storage controller 614 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The server computer 502 can store data on the storage device 618 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 818 is characterized as primary or secondary storage, and the like.

For example, the server computer 502 can store information to the storage device 618 by issuing instructions through the storage controller 614 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The server computer 502 can further read information from the storage device 618 by detecting the physical states or characteristics of one or more particular locations within the physical storage units.

In addition to the mass storage device 618 described above, the server computer 602 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 502. In some examples, the operations performed by devices in a distributed application architecture, and or any components included therein, may be supported by one or more devices similar to server computer 502. Stated otherwise, some or all of the operations performed by the Computer Network Architecture 100, and or any components included therein, may be performed by one or more server computer 502 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 618 can store an operating system 620 utilized to control the operation of the computer 502. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 618 can store other system or application programs and data utilized by the computer 702.

In one embodiment, the storage device 618 or other computer-readable storage media is encoded with computer-executable instructions which, when loaded into the computer 502, transform the computer from a general-purpose computing system into a special-purpose computer capable of implementing the embodiments described herein. These computer-executable instructions transform the computer 502 by specifying how the CPUs 604 transition between states, as described above. According to one embodiment, the computer 502 has access to computer-readable storage media storing computer-executable instructions which, when executed by the computer 502, perform the various processes described above with regard to FIGS. 1-4. The computer 502 can also include computer-readable storage media having instructions stored thereupon for performing any of the other computer-implemented operations described herein.

The server computer 502 can also include one or more input/output controllers 616 for receiving and processing input from a number of input devices, such as a keyboard, a mouse, a touchpad, a touch screen, an electronic stylus, or other type of input device. Similarly, an input/output controller 616 can provide output to a display, such as a computer monitor, a flat-panel display, a digital projector, a printer, or other type of output device. It will be appreciated that the computer 502 might not include all of the components shown in FIG. 6, can include other components that are not explicitly shown in FIG. 6, or might utilize an architecture completely different than that shown in FIG. 6.

As described herein, the server computer 502 may comprise one or more of a router, load balancer and/or server. The server computer 502 may include one or more CPUs 604, configured to execute one or more stored instructions. The CPUs 604 may comprise one or more cores. Further, the computer 502 may include one or more network interfaces configured to provide communications between the server computer 502 and other devices, such as the communications described herein as being performed by the router, load balancer and/or server. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 622 may comprise any type of programs or processes to perform the techniques described in this disclosure for providing a distributed application load-balancing architecture that is capable of supporting multipath transport protocol. That is, the server computer 502 may comprise any one of the routers, load balancers, and/or servers. The programs 622 may comprise any type of program that cause the server computer 502 to perform techniques for communicating with other devices using any type of protocol or standard usable for determining connectivity.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method for implementing network security policies, comprising:
   receiving a security policy request from a user, the security policy request being expressed in a natural language;
   analyzing the natural language to determine that the security policy request includes an intent for creation of a security policy to be enforced for a network;
   determining ambiguities expressed in the natural language such that the intent cannot be translated into the security policy;
   in response to determining the ambiguities, preparing one or more clarifying questions;
   sending the one or more clarifying questions to the user;
   receiving a response from the user, the response including an answer to the one or more clarifying questions;
   generating one or more security policy clauses based at least in part upon the natural language expression of the security policy request and the response received from the user; and
   implementing the security policy for the network using the one or more security policy clauses.

2. The method as in claim 1, further comprising, before implementing the security policy, generating a natural language indication of the security policy to be implemented and sending the natural language indication of the security policy to the user for approval.

3. The method as in claim 1, wherein the one or more security policy clauses are generated using an artificial intelligence natural language translator.

4. The method as in claim 1, wherein the one or more clarifying questions are generated using an artificial intelligence natural language translator.

5. The method as in claim 1, further comprising storing information regarding the generation of the one or more security policy clauses based at least in part upon the security policy request and the answer and using the stored information to learn security policy implementations for future natural language security policy requests.

6. The method as in claim 1, wherein the generating one or more security policy clauses comprises translating the security policy request from the natural language and into computer implementable security policy clauses.

7. The method as in claim 1, wherein the generating one or more clarifying questions further comprises translating the security policy request from the natural language and into a plurality of possible security policy clauses and using the one or more possible security policy clauses to generate the one or more clarifying questions as natural language questions.

8. A natural language security policy configuration system, comprising:
   one or more processors; and
   one or more non-transitory computer-readable media storing computer-executable instructions that, when executed by the one or more processors, cause the one or more processors to perform operations comprising:
      receiving a security policy request from a user, the security policy request being expressed in a natural language;
      analyzing the natural language to determine that the security policy request includes an intent for creation of a security policy to be enforced for a network;
      determining ambiguities expressed in the natural language such that the intent cannot be translated into the security policy;
      in response to determining ambiguities, preparing one or more clarifying questions;
      sending the one or more clarifying questions to the user;
      receiving a response from the user, the response including an answer to the one or more clarifying questions;
      generating one or more security policy clauses based at least in part upon the natural language expression of the security policy request and the response received from the user; and
      implementing the security policy for the network using the one or more security policy clauses.

9. The natural language security policy configuration system as in claim 8, further comprising, before implementing the security policy, generating a natural language indication of the security policy to be implemented and sending the natural language indication of the security policy to the user for approval.

10. The natural language security policy configuration system as in claim 8, wherein the one or more security policy clauses are generated using an artificial intelligence natural language translator.

11. The natural language security policy configuration system as in claim 8, wherein the one or more clarifying questions are generated using an artificial intelligence natural language translator.

12. The natural language security policy configuration system as in claim 8, further comprising storing information regarding the generation of the one or more security policy clauses based at least in part upon the security policy request and the answer and using the stored information to learn security policy implementations for future natural language security policy requests.

13. The natural language security policy configuration system as in claim 8, wherein the generating one or more security policy clauses comprises translating the security policy request from the natural language and into computer implementable security policy clauses.

14. The natural language security policy configuration system as in claim 8, wherein the generating one or more clarifying questions further comprises translating the security policy request from the natural language and into a plurality of possible security policy clauses, and using the one or more possible security policy clauses to generate the one or more clarifying questions as natural language questions.

15. One or more non-transitory computer-readable media storing computer-executable instructions that, when executed by one or more processors, cause the one or more processors to perform operations comprising:
  receiving a security policy request from a user, the security policy request being expressed in a natural language;
  analyzing the natural language to determine that the security policy request includes an intent for creation of a security policy to be enforced for a network;
  determining ambiguities expressed in the natural language such that the intent cannot be translated into the security policy;
  in response to determining the ambiguities, preparing one or more clarifying questions;
  sending the one or more clarifying questions to the user;
  receiving a response from the user, the response including an answer to the one or more clarifying questions;
  generating one or more security policy clauses based at least in part upon the natural language expression of the security policy request security policy request and the response received from the user; and
  implementing the security policy for the network using the one or more security policy clauses.

16. The one or more non-transitory computer-readable media as in claim 15, further comprising, before implementing the security policy, generating a natural language indication of the security policy to be implemented and sending the natural language indication of the security policy to the user for approval.

17. The one or more non-transitory computer-readable media as in claim 15, wherein the one or more security policy clauses are generated using an artificial intelligence natural language translator.

18. The one or more non-transitory computer-readable media as in claim 15, wherein the one or more clarifying questions are generated using an artificial intelligence natural language translator.

19. The one or more non-transitory computer-readable media as in claim 15, further comprising storing information regarding the generation of the one or more security policy clauses based at least in part upon the security policy request and the answer and using the stored information to learn security policy implementations for future natural language security policy requests.

20. The one or more non-transitory computer-readable media as in claim 19, wherein the generating one or more security policy clauses comprises translating the security policy request from the natural language and into computer implementable security policy clauses.

\* \* \* \* \*